(12) United States Patent
Justl

(10) Patent No.: US 11,014,023 B2
(45) Date of Patent: May 25, 2021

(54) DEGASSING SYSTEM AND METHOD OF EXECUTING A DEGASSING PROCESS OF A LIQUID AND BEVERAGE TREATMENT MACHINE

(71) Applicant: Krones AG, Neutraubling (DE)

(72) Inventor: Johanna Justl, Sinzing (DE)

(73) Assignee: Krones AG, Neutraubling (DE)

( * ) Notice: Subject to any disclaimer, the term of this patent is extended or adjusted under 35 U.S.C. 154(b) by 268 days.

(21) Appl. No.: 16/392,342

(22) Filed: Apr. 23, 2019

(65) Prior Publication Data

US 2019/0321754 A1    Oct. 24, 2019

(30) Foreign Application Priority Data

Apr. 24, 2018  (DE) .......................... 102018206313.3

(51) Int. Cl.
| | | |
|---|---|---|
| *B01D 19/00* | (2006.01) | |
| *A23L 2/54* | (2006.01) | |
| *A23L 2/76* | (2006.01) | |
| *B01F 3/04* | (2006.01) | |
| *B67C 3/22* | (2006.01) | |

(52) U.S. Cl.
CPC ............ *B01D 19/0005* (2013.01); *A23L 2/54* (2013.01); *A23L 2/76* (2013.01); *B01D 19/0036* (2013.01); *B01D 19/0047* (2013.01); *B01D 19/0063* (2013.01); *B01D 19/0068* (2013.01); *B01F 3/04808* (2013.01); *B67C 3/22* (2013.01);

(Continued)

(58) Field of Classification Search
CPC ................ B01D 19/00; B01D 19/0036; B01D 19/0047; B01D 19/0063
See application file for complete search history.

(56) References Cited

U.S. PATENT DOCUMENTS

| | | |
|---|---|---|
| 5,203,890 A | 4/1993 | Tatsuo |
| 5,266,481 A | 11/1993 | Wegner et al. |

(Continued)

FOREIGN PATENT DOCUMENTS

| | | |
|---|---|---|
| CN | 102 826 621 A | 12/2012 |
| CN | 104664542 A | 6/2015 |

(Continued)

OTHER PUBLICATIONS

Chinese Office Action dated Feb. 24, 2021, on application No. 201910331844.7.

(Continued)

*Primary Examiner* — Robert A Hopkins
(74) *Attorney, Agent, or Firm* — Lowenstein Sandler LLP

(57) ABSTRACT

A degassing system includes a degassing tank with a first space area configured for having liquid introduced therein and a second space area configured for having the liquid from the first space area introduced therein. The first and the second space area are partially separated from one another by a separation element. The degassing system includes a controllable pump configured to pump liquid from the first space area to the second space area for a two-stage vacuum degassing process responsive to the pump being operated. The degassing system includes a control device configured to control the pump to not be operated for a single-stage vacuum degassing process and to be operated for a two-stage vacuum degassing process.

20 Claims, 5 Drawing Sheets

(52) U.S. Cl.
CPC ..... *A23V 2002/00* (2013.01); *B01F 2003/049* (2013.01); *B01F 2215/0022* (2013.01)

(56) References Cited

U.S. PATENT DOCUMENTS 5,308,384 A * 5/1994 Kapanen .................. D21D 5/26
                                                                                                                       95/260
2018/0016143 A1 1/2018 Nasato et al.

FOREIGN PATENT DOCUMENTS

| CN | 107617237 A | 1/2018 |
|---|---|---|
| DE | 20 20 871 A1 | 11/1971 |
| DE | 24 19 676 A1 | 10/1974 |
| DE | 10 2009 031106 A1 | 12/2010 |
| GB | 638198 A | 5/1950 |
| GB | 1323957 A | 7/1973 |
| GB | 1461591 A | 1/1977 |
| WO | 92/03659 A1 | 3/1992 |

OTHER PUBLICATIONS

Bluml, Susanne, and Sven Fischer. Manual of Filling Technology: The Theory and Practice of Filling Liquid Products. Volker, 2004. pp. 500-509.
German Search Report dated Jan. 25, 2019, on application No. 10 2018 206 313.3.

* cited by examiner

DEGASSING SYSTEM AND METHOD OF EXECUTING A DEGASSING PROCESS OF A LIQUID AND BEVERAGE TREATMENT MACHINE

RELATED APPLICATIONS

This application claims the benefit under 35 U.S.C. § 119(a) of German Application No. 102018206313.3, filed Apr. 24, 2018, which is incorporated by reference.

TECHNICAL FIELD

The present disclosure relates to a degassing system, a method of executing a degassing process of a liquid and a beverage treatment machine.

BACKGROUND

The reference DE 20 20 871 discloses a method and an apparatus for vacuum degassing liquids in at least two stages. In a first degassing stage, the liquid can be pre-degassed. Subsequently, the pre-degassed liquid is heated and, after heating, transferred to the second degassing stage. In the second degassing stage, gaseous and vaporous components escaping from the liquid are recirculated to the first degassing stage and both degassing stages are evacuated via a common vacuum pumping unit.

The "Manual of Filling Technology: The Theory and Practice of Filling Liquid Products" by S. Blüml et al. (Behr's Verlag (publishing house), Hamburg, 2004; ISBN 3-89947-089-3) discloses that the most important techniques for the degassing of water required in beverage production are physical processes, including pressure degassing, vacuum degassing as well as combined pressure and vacuum degassing. The principle of pressure degassing is based on removing oxygen and nitrogen components from the water by adding carbon dioxide ($CO_2$). Vacuum degassing is based on a vacuum atmosphere in the degassing tank. The water to be degassed is injected through nozzles into the degassing tank and, due to the negative pressure, the oxygen and nitrogen components in the water are removed and extracted from the tank.

The reference DE 10 2009 031 106 A1 discloses a method and an apparatus for degassing a liquid. In a vacuum housing, the liquid can be sprayed and degassed by a spray degassing unit. This liquid can then be tested within the vacuum housing by a sensor, so as to determine which amount of gas is still contained therein. Depending on the gas content values measured by the sensor, the control unit ensures that all or part of the liquid, from which all the gas or part of the gas has been removed, is circulated, fed via a return flow line to a second spray degassing unit and degassed once more. Alternatively, it would, however, also be possible to discharge a part or all of the liquid contained in the vacuum housing via the discharge unit and to provide it then for further use.

BRIEF DESCRIPTION OF THE DRAWINGS

Embodiments of the present disclosure are illustrated by way of example, and not by way of limitation, in the figures of the accompanying drawings.

DETAILED DESCRIPTION

Figure 1A:
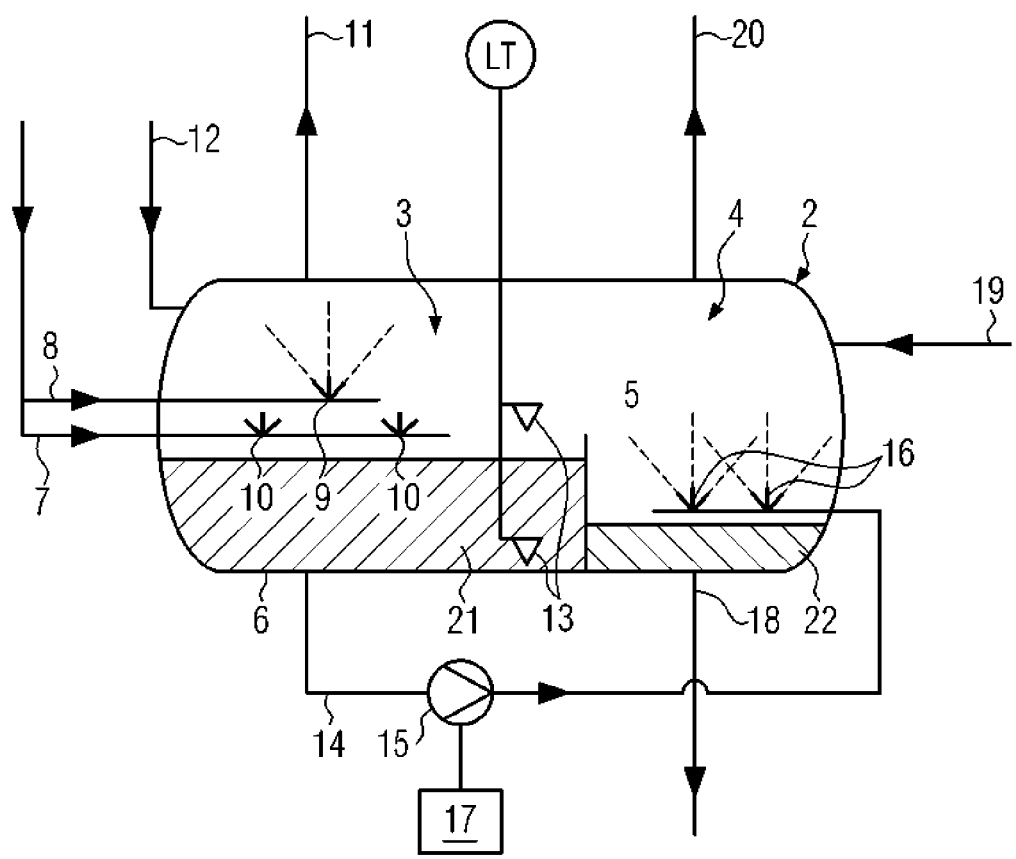
FIG. 1A illustrates a degassing system in a two-stage vacuum degassing process, according to certain embodiments.

The present disclosure provides a degassing system, which allows a lower consumption of media and a longer service life of a circulation pump, and a corresponding, efficient method that works making use of such a degassing system.

The present disclosure provides a degassing system, a method of executing a degassing process of a liquid and a beverage treatment machine.

A degassing system according to embodiments of the present disclosure includes a control device, a degassing tank with a first space area configured for having liquid introduced therein, e.g. by one or a plurality of nozzles, and a second space area configured for having the liquid from the first space area introduced therein, e.g. by one or a plurality of nozzles, a line being provided between the first area and the second area and the first space area and the second space area being partially separated from one another by at least one separation element. A controllable pump is provided, which is configured for pumping liquid from the first space area through the line to the second space area for a two-stage vacuum degassing process, when the pump is operated. The control device is configured to control the pump such that the pump will not be operated for a single-stage vacuum degassing process and will be operated for a two-stage vacuum degassing process.

Due to the controllable pump, the use of the degassing system can easily be varied between a single-stage and a two-stage vacuum degassing process. This can additionally lead to a longer service life of the pump, and control can be executed e.g. depending on the liquid or by making use of the product to be produced with the liquid.

For introducing the liquid into the first and second space area, respectively, not only one or a plurality of nozzles may be used but also any kind of other devices, by which the liquid can be finely distributed, so that this liquid will have a largest possible surface. Likewise, it is imaginable to introduce the liquid in the first or second space area such that a liquid film is formed.

The at least one separation element may be configured such that, in the single-stage vacuum degassing process, liquid from the first space area can overflow the at least one separation element into the second space area and that, in the two-stage degassing process, the liquid is retained in the first area by the at least one separation element.

The degassing system may include devices, such as one or a plurality of vacuum pumps, in order to establish a vacuum in the first and/or second space area.

The first space area may have provided therein a first feed line for a first stripping gas, where the first feed line is provided below or above a predetermined first liquid level. In some embodiments, the gas used as the first stripping gas is an inert gas, carbon dioxide or nitrogen.

The second space area may have provided therein a second feed line for a second stripping gas, where the second feed line is provided below or above a predetermined second liquid level, where the gas used as the second stripping gas is an inert gas, carbon dioxide or nitrogen. By adding the stripping gas, the degassing of the liquid can be improved.

Alternatively, a feed line for stripping gas may be provided in the first space area and an exhaust pump line in the second space area.

According to another embodiment, a feed line for stripping gas may be provided in the second space area and an exhaust pump line in the first space area.

The first and/or the second stripping gas may be fed depending on the degassing requirements of the liquid, e.g. a minimum residual gas content.

For example, the first and/or second stripping gas may be fed as a third degassing stage, so as to accomplish a necessary residual gas content of the liquid, which, for example, would not be accomplishable, if only the two-stage vacuum degassing process were used.

Alternatively, the degassing system may be operated without establishing a vacuum in the first and/or second space area and degassing may be executed by feeding the first and/or second stripping gas. This can be referred to as pressure degassing.

In addition, the second space area may include a liquid discharge unit. Making use of the liquid discharge unit, the liquid contained in the second space area can be removed therefrom and fed to further operational processes.

The degassing tank may be oriented horizontally and the at least one separation element may be arranged in the lower area of the degassing tank as at least one partition having a height. The separation element may have a height, so that the liquid accumulating on the bottom and in the lower area of the degassing tank can overflow from the first space area into the second space area, if the liquid level in the first space area exceeds the height of the at least one partition.

Alternatively, the degassing tank may be oriented vertically and the at least one separation element may be configured as at least one annular collection tray. The at least one annular collection tray may have a height and a central flow-through opening for liquid. Liquid accumulating in the at least one collection tray can overflow from the at least one collection tray, i.e. from the first space area, into the second space area, if the liquid level in the at least one collection tray exceeds the height of the latter.

The control device may additionally be configured for accessing a database, which includes control parameters for the pump. In some embodiments, the control parameters include liquid-specific data. The liquid-specific data may include values for an aimed-at residual oxygen content of the liquid after the two-stage vacuum degassing process.

The degassing system may further include at least one sensor for determining a liquid level in the first space area. In some embodiments, the at least one sensor is for transmitting a value of the liquid level determined. The value of the liquid level may be transmitted to the control device and used by the latter as a parameter for starting or stopping the operation of the pump.

The degassing system may further include at least one sensor for determining a liquid level in the second space area. In some embodiments, the at least one sensor is for transmitting a value of the liquid level determined. The value of the liquid level may be transmitted to the control device and used by the latter as a parameter for preventing the pump from dry running.

A method of executing a degassing process of a liquid, making use of a degassing system as described hereinbefore or hereinafter, includes the following acts: introducing and spraying the liquid in the first space area of the degassing tank by the one or the plurality of nozzles, whereby the liquid may be degassed at least partially and an at least partially degassed liquid may be produced, and accumulation of the at least partially degassed liquid in the first space area. Subsequently, a) if the pump is not operated, transferring the at least partially degassed liquid from the first space area to the second space area through a flow of the at least partially degassed liquid over the separation element, or b) if the pump is operated, pumping the at least partially degassed liquid via the line from the first space area to the second space area, introducing the at least partially degassed liquid into the second space area by the one or the plurality of nozzles, whereby, by further degassing, a liquid, which has been degassed once more at least partially, is produced.

In the first and/or second space area, a vacuum may be established by one or a plurality of vacuum pumps.

In addition, feeding of the first stripping gas into the first space area may take place by the first stripping gas feed line.

In addition, feeding of a second stripping gas into the second space area may take place by the second stripping gas feed line. By feeding the stripping gas, the degassing characteristics of the liquid can be improved.

The feeding of the first and/or second stripping gas may take place depending on the degassing requirements of the liquid, e.g., a minimum residual gas content.

For example, the first and/or second stripping gas may be fed as a third degassing stage, so as to accomplish a residual gas content of the liquid, which, for example, may not be accomplishable if only the two-stage vacuum degassing process were used.

Alternatively, the degassing system may be operated without establishing a vacuum in the first and/or second space area and degassing may be executed by feeding the first and/or second stripping gas.

In addition, a liquid level in the first space area may be determined by the at least one sensor. In some embodiments, a value of the determined liquid level may be transmitted. The value of the liquid level may be transmitted to the control device and used by the latter as a parameter for starting or stopping the operation of the pump.

A beverage treatment machine includes the degassing system as described hereinbefore or hereinafter and a filling plant arranged downstream of the degassing system. By the filling plant, a beverage, a liquid product, or a liquid, which has been degassed in the degassing system, can be filled into containers.

The beverage treatment machine may further include an apparatus for mixing beverages, a liquid product, and/or a liquid and/or for providing carbonation, which is arranged downstream of the degassing system, the filling plant being arranged downstream of the apparatus for mixing beverages and/or for providing carbonation.

The enclosed figures illustrate aspects of the present disclosure.

FIG. 1A shows a first embodiment of a degassing system 1, which is operated in a two-stage vacuum degassing process in the present representation. The degassing system 1 includes a degassing tank 2, which is oriented horizontally, i.e. the longitudinal axis of the degassing tank 2 extends horizontally. The degassing tank 2 may include two space areas 3, 4, the first stage of vacuum degassing being carried out in a first space area 3 and the second stage of vacuum degassing being carried out in a second space area 4. In FIG. 1A the first space area 3 is arranged on the left-hand side of the degassing tank 2 shown and the second space area 4 is arranged on the right-hand side. The first space area 3 and the second space area 4 are partially separated from each other by a separation element 5, the separation element 5 being directed upwards from the bottom 6 of the degassing tank 2. The separation element 5 has a height h1, so that liquid which accumulates on the bottom 6 and in the lower area of the degassing tank 2 can flow from the first space area 3 into the second space area 4, if the liquid level in the first space area 3 exceeds the height h1. In the two-stage degassing process, liquid can flow from the second area 4 back into the first area 3, if not enough liquid is removed via the discharge unit 18 and the liquid level in the second space area 4 rises, so that it exceeds the height h1.

The liquid is introduced in the first space area 3 by two liquid feed lines 7, 8, one liquid feed line 8 being provided with a nozzle 9 and the other liquid feed line 7 with two nozzles 10 for spraying the liquid. For generating the vacuum in the first space area 3, a first exhaust pump line 11 is provided.

In the first space area 3, a first stripping gas feed line 12 for feeding a first stripping gas is additionally provided, the first stripping gas feed line 12 being provided above a predetermined first liquid level.

The bottom 6 of the degassing tank 2 has connected to a line 14 in the first space area 3. When a pump 15 is in operation, the liquid is pumped through this line 14 from the first space area 3 to two nozzles 16 of the second space area 4, where the liquid is sprayed for the second stage of the degassing process. The operation of the pump 15 is controlled by a control device 17.

In order to be able to determine the liquid level in the first space area 3, two sensors 13 are provided for determining the liquid level and for transmitting the result, e.g., to the control device 17 for controlling the operation of the pump 15. For example, two level sensors or a continuous filling level measurement may be used.

The second space area 4 further includes a liquid discharge unit 18 by which liquid can be removed from the second space area 4. In some embodiments, the liquid may be fed to further process acts or steps.

In the second space area 4, a second stripping gas feed line 19 for a second stripping gas is provided, the second stripping gas feed line 19 being provided above a predetermined second liquid level. For generating the vacuum in the second space area 4, a second exhaust pump line 20 is provided.

For the two-stage vacuum degassing process, liquid is sprayed by the nozzles 9, 10 in the first space area 3 in the first stage of vacuum degassing, so that the liquid will be degassed at least partially. The at least partially degassed liquid 21 accumulates in/on the bottom 6 and in the lower area of the degassing tank 2 in the first space area 3. At least before the liquid level of the at least partially degassed liquid 21 rises above the height h1 of the separation element 5, the pump 15 is started by the control device 17, so that, via the line 14, the at least partially degassed liquid 21 can be conducted to the second space area 4, where it can be sprayed by two nozzles 16 in the second stage of vacuum degassing. The liquid 22, which has been degassed a second time, accumulates in/on the bottom 6 and in the lower area of the degassing tank 2 in the second space area 4, from where this liquid 22 can then be fed to further process acts via the liquid discharge unit 18.

Figure 1B:
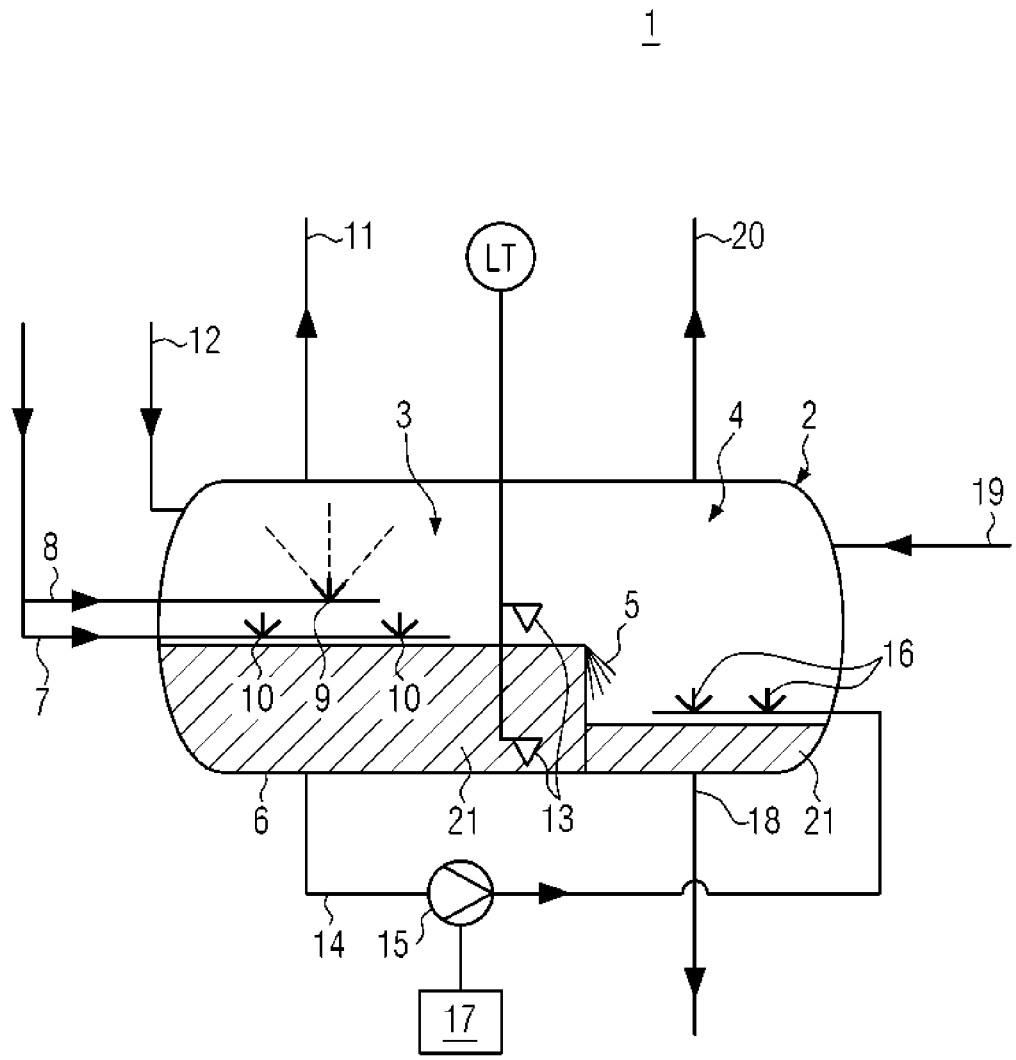
FIG. 1B illustrates a single-stage vacuum degassing process, according to certain embodiments.

FIG. 1B shows the first embodiment of the degassing system 1 described in FIG. 1A, this first embodiment being operated in a single-stage vacuum degassing process in the present representation. The pump 15 is here controlled by the control device 17 such that the pump 15 is normally not operated. Only in the event that liquid is to be prevented from remaining in the first space area 3 and in the line 14, it may become necessary that the control device 17 controls the pump 15 such that the latter will be operated.

For the single-stage vacuum degassing process, liquid is sprayed by the nozzles 9, 10 in the first space area 3 in the first stage of vacuum degassing, so that the liquid will be degassed at least partially. The at least partially degassed liquid 21 accumulates in/on the bottom 6 and in the lower area of the degassing tank 2 in the first space area 3. If the liquid level of the at least partially degassed liquid 21 exceeds the height h1 of the separation element 5, the at least partially degassed liquid 21 will overflow the separation element 5 and thus arrive in the second space area 4. In the second space area 4, a spraying of liquid does not take place. The mere fact that the liquid overflows the separation element 5 may result in further slight degassing, which, however, is not regarded as a second degassing process.

The at least partially degassed liquid 21 that has flown into the second space area 4 accumulates in/on the bottom 6 and in the lower area of the degassing tank 2 in the second space area 4, from where this liquid can then be fed to further process acts via the liquid discharge unit 18.

Figure 2A:
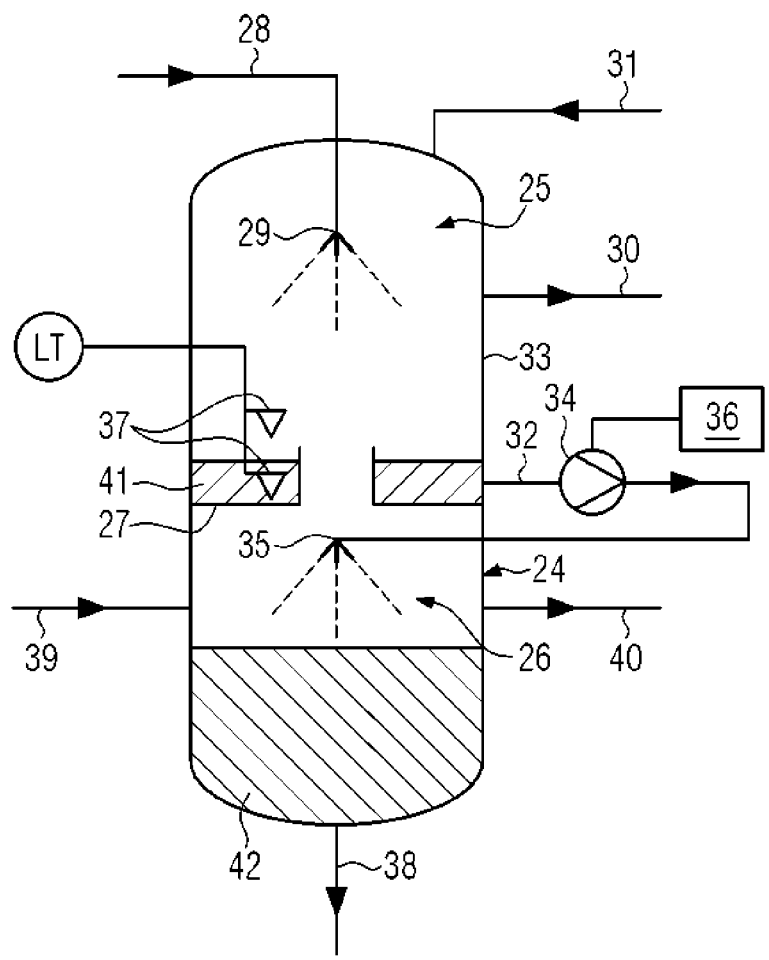
FIG. 2A illustrates a degassing system in a two-stage vacuum degassing process, according to certain embodiments.

FIG. 2A shows a further embodiment of a degassing system 23, which is operated in a two-stage vacuum degassing process in the present representation. The degassing system 23 includes a degassing tank 24, which is oriented vertically, i.e. the longitudinal axis of the degassing tank 24 extends vertically. The degassing tank 24 can be considered to include two space areas 25, 26, the first stage of vacuum degassing being carried out in a first space area 25 and the second stage of vacuum degassing in a second space area 26. In FIG. 2A, the first space area 25 is arranged above the second space area 26. The first space area 25 and the second space area 26 are partially separated from one another by a separation element 27. The separation element 27 is configured as an annular collection tray 27 having a height h2 and a central flow-through opening for liquid. Liquid that accumulates in the collection tray 27 can flow from the collection tray 27, i.e. from the first space area 25, into the second space area 26, if the liquid level in the collection tray 27 is higher than the height h2.

The liquid is introduced in the first space area 25 by a liquid feed line 28, the liquid feed line 28 being provided with a nozzle 29 for spraying the liquid. For generating the vacuum in the first space area 25, a first exhaust pump line 30 is provided.

In the first space area 25, a first stripping gas feed line 31 for feeding a first stripping gas is additionally provided, the first stripping gas feed line 31 being provided above a predetermined height above the collection tray 27.

Via a line 32, which is arranged on a circumferential surface 33 of the degassing tank 24, the liquid can be pumped, when a pump 34 is in operation, from the collection tray 27 in the first space area 25 to a nozzle 35 of the second space area 26, where it is sprayed for the second stage of the degassing process. The operation of the pump 34 is controlled by a control device 36.

In order to be able to determine the liquid level on the collection tray 27 in the first space area 25, two sensors 37 are provided for determining the liquid level and for transmitting the result e.g. to the control device 36 for controlling the operation of the pump 34.

The second space area 26 further includes a liquid discharge unit 38 by which liquid can be removed from the second space area 26 and e.g. fed to further process acts.

In the second space area 26, a second stripping gas feed line 39 is provided for feeding a second stripping gas, the second stripping gas feed line 39 being provided above a predetermined liquid level. For generating the vacuum in the second space area 26, a second exhaust pump line 40 is provided.

For the two-stage vacuum degassing process, liquid is sprayed by the nozzle 29 in the first space area 25 in the first stage of vacuum degassing, so that the liquid will be degassed at least partially. The at least partially degassed liquid 41 accumulates in/on the collection tray 27. At least before the liquid level of the at least partially degassed liquid 41 rises above the height h2 of the collection tray 27, the pump 34 is started by the control device 36, so that, via the line 32, the at least partially degassed liquid 41 can be conducted to the second space area 26, where it can be sprayed by a nozzle 35 in the second stage of vacuum degassing. The liquid 42, which has been degassed a second time, accumulates in the lower area of the degassing tank 24 in the second space area 26, from where this liquid 42 can then be fed to further process acts via the liquid discharge unit 38.

Figure 2B:
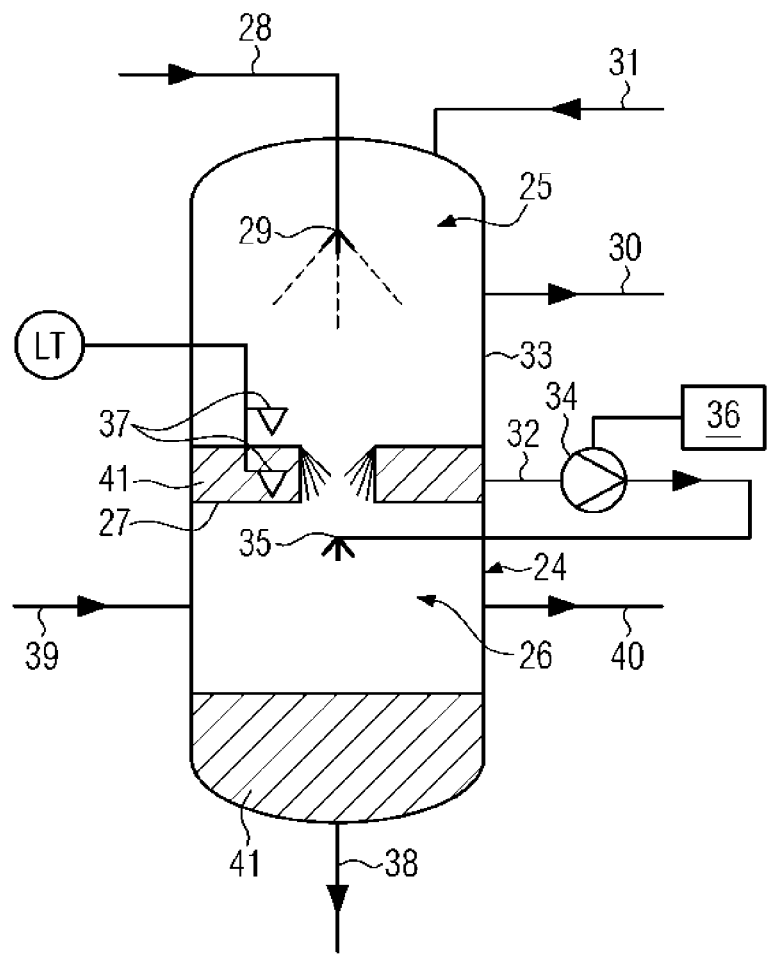
FIG. 2B illustrates a single-stage vacuum degassing process, according to certain embodiments.

FIG. 2B shows the second embodiment of the degassing system 23 described in FIG. 2A, this second embodiment being operated in a single-stage vacuum degassing process in the present representation. The pump 34 is here controlled by the control device 36 such that the pump 34 is normally not operated. Only in the event that liquid is to be prevented from remaining in the line 32, it may become necessary that the control device 36 controls the pump 34 such that the latter will be operated.

For the single-stage vacuum degassing process, liquid is sprayed by the nozzle 29 in the first space area 25 in the first stage of vacuum degassing, so that the liquid will be degassed at least partially. The at least partially degassed liquid 41 accumulates in/on the collection tray 27 in the first space area 25. If the liquid level of the at least partially degassed liquid 41 exceeds the height h2 of the collection tray 27, the at least partially degassed liquid 41 will overflow the collection tray 27 and thus arrive at the second space area 26. In the second space area 26, a spraying of liquid does not take place. The mere fact that the liquid 41 overflows the collection tray 27 may result in further slight degassing, which, however, is not regarded as a second degassing process.

The at least partially degassed liquid 41 that has flown into the second space area 26 accumulates in the lower area of the degassing tank 24 in the second space area 26, from where this liquid can then be fed to further process acts via the liquid discharge unit 38.

Figure 3:
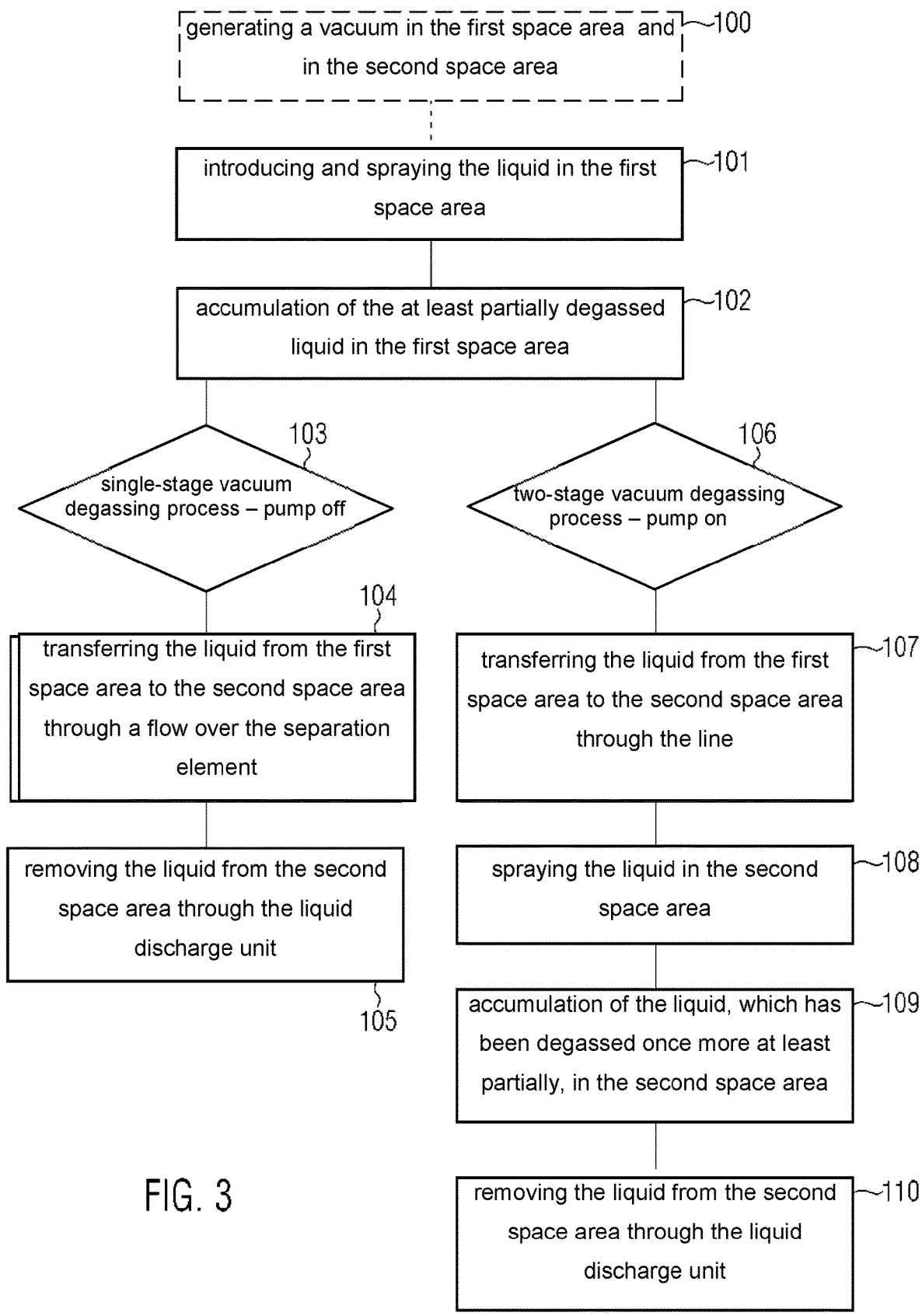
FIG. 3 illustrates a flowchart of a method of executing a degassing process of a liquid making use of a degassing system, according to certain embodiments.

FIG. 3 shows a flowchart of a method of executing a degassing process of a liquid making use of a degassing system 1, 23 according to the present disclosure.

If a vacuum should not yet prevail in the degassing tank 2, 24, a vacuum can be generated in the degassing tank 2, 24 in an optional first act 100 by the first exhaust pump line 11, 30 of the first space area 3, 25 and the second exhaust pump line 20, 40 of the second space area 4, 26. The optional first act 100 may also include maintaining the vacuum constant.

Subsequently, the liquid can be introduced and sprayed in the first space area 3, 25 via liquid feed lines 7, 8, 28 and nozzles 9, 10, 29 in a further act 101, whereby the liquid will be degassed. As a result, the at least partially degassed liquid 21, 41 will accumulate in the first space area 3, 25.

If a single-stage vacuum degassing process 103 is to be carried out, the pump 15, 34 will not be operated, so that, in an act 104, the at least partially degassed liquid 21, 41 is transferred from the first space area 3, 25 to the second space area 4, 26 through a flow of the at least partially degassed liquid 21, 41 over the separation element 5, 27. In an act 105, the liquid can be removed from the second space area 4, 26 through a liquid discharge unit 18, 38 and fed to further process acts.

In a single-stage vacuum degassing process, the pump 15, 34 may also be temporarily operated for a short time. In this way, there can be an exchange of liquid from the first space area 3, 25 to the second space area 4, 26.

If a two-stage vacuum degassing process 106 is to be carried out, the pump 15, 34 will be operated, e.g. by controlling it by the control device 17, 36. A control of the pump 15, 34 by the control device 17, 36 for operating the pump 15, 34 may take place before a predetermined liquid level is reached in the first space area 3, 25. In an act 107, the at least partially degassed liquid 21, 41 is transferred through the line 18, 38 from the first space area 3, 25 to the second space area 4, 26 by operating the pump 15, 34. The at least partially degassed liquid 21, 41 is transferred through the line 18, 31 to nozzles 16, 35 in the second space area 4, 26 and sprayed by the one or the plurality of nozzles 16, 35 in an act 108, whereby, through further degassing, a liquid 22, 42 is produced, which has been degassed once more at least partially. In act 109, the liquid 22, 42, which has been degassed once more at least partially, accumulates in the second space area 4, 26 during spraying of the liquid. In act 110, the liquid, which has been degassed once more at least partially, can be removed from the second space area 4, 26 via a liquid discharge unit 18, 38 and e.g., fed to further process acts.

In addition, a first stripping gas can be fed into the first space area by the first stripping gas feed line.

In addition, a second stripping gas can be fed into the second space area by the second stripping gas feed line.

In addition, the liquid level in the first space area can be determined by at least one sensor. In some embodiments, a value of the determined liquid level can be transmitted.

It is to be understood that the above description is intended to be illustrative, and not restrictive. Many other embodiments will be apparent upon reading and understanding the above description. Although embodiments of the present disclosure have been described with reference to specific example embodiments, it will be recognized that the invention is not limited to the embodiments described, but can be practiced with modification and alteration within the spirit and scope of the appended claims. Accordingly, the specification and drawings are to be regarded in an illustrative sense rather than a restrictive sense. The scope of the invention should, therefore, be determined with reference to the appended claims, along with the full scope of equivalents to which such claims are entitled.

The invention claimed is:

1. A degassing system comprising:
    a degassing tank with a first space area configured for having liquid introduced therein and a second space area configured for having the liquid from the first space area introduced therein;
    a line provided between the first space area and the second space area, the first space area and the second space area being partially separated from one another by at least one separation element;
    a controllable pump configured for pumping liquid from the first space area through the line to the second space area for a two-stage vacuum degassing process responsive to the pump being operated; and a control device configured to control the controllable pump to not be operated for a single-stage vacuum degassing process and to be operated for the two-stage vacuum degassing process.

2. The degassing system of claim 1, wherein the at least one separation element is configured such that, in the single-stage vacuum degassing process, liquid from the first space area is to overflow the at least one separation element into the second space area and that, in the two-stage vacuum degassing process, the liquid is retained in the first space area by the at least one separation element.

3. The degassing system of claim 1, wherein the first space area has provided therein a first stripping gas feed line for feeding a first stripping gas, wherein the first stripping gas feed line is provided below or above a predetermined first liquid level, wherein the gas used as the first stripping gas is an inert gas, carbon dioxide or nitrogen.

4. The degassing system of claim 1, wherein the second space area has provided therein a second stripping gas feed line for feeding a second stripping gas, wherein the second stripping gas feed line is provided below or above a predetermined second liquid level, wherein gas used as the second stripping gas is an inert gas, carbon dioxide or nitrogen.

5. The degassing system of claim 1, wherein the second space area further comprises a liquid discharge unit.

6. The degassing system of claim 1, wherein the degassing tank is oriented horizontally and the at least one separation element is arranged as at least one partition having a height and extending from a bottom of the degassing tank.

7. The degassing system of claim 1, wherein the degassing tank is oriented vertically and the at least one separation element is configured as at least one collection tray, wherein the at least one collection tray has a height and a central flow-through opening for the liquid.

8. The degassing system of claim 1, wherein the control device is additionally configured for accessing a database, which comprises control parameters for the pump, the control parameters comprising liquid-specific data.

9. The degassing system of claim 1, further comprising at least one sensor for determining a liquid level in the first space area and for transmitting a value of the liquid level determined.

10. A method of executing a degassing process of a liquid, the method comprising:
introducing and spraying the liquid in a first space area of a degassing tank of a degassing system, wherein the liquid is to be degassed at least partially to produce an at least partially degassed liquid;
accumulating the at least partially degassed liquid in the first space area;
responsive to a pump not being operated, transferring the at least partially degassed liquid from the first space area to a second space area through a flow of the at least partially degassed liquid over at least one separation element; and
responsive to the pump being operated, pumping the at least partially degassed liquid via a line from the first space area to the second space area, introducing the at least partially degassed liquid into the second space area by one or more nozzles to further de-gas the at least partially degassed liquid.

11. The method of claim 10 further comprising:
feeding a first stripping gas into the first space area by a first stripping gas feed line.

12. The method of claim 10 further comprising:
feeding a second stripping gas into the second space area by a second stripping gas feed line.

13. The method of claim 10 further comprising:
determining, by a sensor, a liquid level in the first space area; and
transmitting a value of the determined liquid level.

14. A beverage treatment machine comprising:
a degassing system comprising:
a degassing tank with a first space area configured for having liquid introduced therein and a second space area configured for having the liquid from the first space area introduced therein;
a line provided between the first space area and the second space area, the first space area and the second space area being partially separated from one another by at least one separation element;
a controllable pump configured for pumping liquid from the first space area through the line to the second space area for a two-stage vacuum degassing process responsive to the pump being operated; and
a control device configured to control the controllable pump to not be operated for a single-stage vacuum degassing process and to be operated for the two-stage vacuum degassing process; and
a filling plant arranged downstream of the degassing system and used for liquid filling.

15. The beverage treatment machine of claim 14, further comprising:
an apparatus for one or more of mixing the liquid or for carbonation, wherein the apparatus is arranged downstream of the degassing system, and wherein the filling plant is arranged downstream of the apparatus.

16. The beverage treatment machine of claim 14, wherein the at least one separation element is configured such that, in the single-stage vacuum degassing process, liquid from the first space area is to overflow the at least one separation element into the second space area and that, in the two-stage vacuum degassing process, the liquid is retained in the first space area by the at least one separation element.

17. The beverage treatment machine of claim 14, wherein the first space area has provided therein a first stripping gas feed line for feeding a first stripping gas, wherein the first stripping gas feed line is provided below or above a predetermined first liquid level, wherein the gas used as the first stripping gas is an inert gas, carbon dioxide or nitrogen.

18. The beverage treatment machine of claim 14, wherein the second space area has provided therein a second stripping gas feed line for feeding a second stripping gas, wherein the second stripping gas feed line is provided below or above a predetermined second liquid level.

19. The beverage treatment machine of claim 18, wherein gas used as the second stripping gas is an inert gas, carbon dioxide or nitrogen.

20. The method of claim 10, wherein the pump being operated to pump the liquid from the first space area through the line to the second space area is for a two-stage vacuum degassing process and not for a single-stage vacuum degassing process.

* * * * *